United States Patent [19]

Ginzburg et al.

[11] Patent Number: 5,119,402
[45] Date of Patent: Jun. 2, 1992

[54] METHOD AND APPARATUS FOR TRANSMISSION OF LOCAL AREA NETWORK SIGNALS OVER UNSHIELDED TWISTED PAIRS

[75] Inventors: Simon A. Ginzburg, Groton; John M. Rieger, Plaineville, both of Mass.

[73] Assignee: Digital Equipment Corporation, Maynard, Mass.

[21] Appl. No.: 545,310

[22] Filed: Jun. 26, 1990

[51] Int. Cl.⁵ .............................................. H04L 25/49
[52] U.S. Cl. ........................................ 375/17; 375/18; 375/36; 375/38
[58] Field of Search .................. 370/37, 112, 118; 375/17, 18, 20, 36, 38; 455/59; 380/33

[56] References Cited

U.S. PATENT DOCUMENTS

| | | | |
|---|---|---|---|
| 4,117,277 | 9/1978 | Elzen et al. | 375/18 |
| 4,123,710 | 10/1978 | Stuart et al. | 375/18 |
| 4,383,316 | 5/1983 | Seidel | 370/118 |
| 4,571,734 | 2/1986 | Dolivo et al. | 375/18 |
| 4,630,286 | 12/1986 | Betts | 375/38 |
| 4,734,920 | 3/1988 | Betts | 375/38 |
| 4,775,987 | 10/1988 | Miller | 370/118 |
| 4,862,456 | 8/1989 | Giorgio | 375/38 |
| 4,980,897 | 12/1990 | Decker et al. | 375/38 |

OTHER PUBLICATIONS

Mischa Schwartz, "Information Transmission, Modulation, and Noise," (3d ed.), pp. 188-197, McGraw-Hill, New York, (1980).
A. P. Clark, "Principles of Digital Data Transmission," (2d ed.), pp. 207-245, Wiley, New York (1983).
Dae Young Kim et al., "Run-Length-Limited Variants of Duobinary and Mondified Duobinary," IEEE Trans. on Comm., vol. COM-35, No. 2, Feb. 1987, pp. 142-150.
Eric Hindin, "Media filter lets 16-M-bit/s token ring cards use unshielded twisted pair," Data Communications, Nov. 1989, pp. 151-154.

Primary Examiner—Benedict V. Safourek
Attorney, Agent, or Firm—Noel F. Heal; A. Sidney Johnston

[57] ABSTRACT

Apparatus, and a related method for its operation, for transmitting binary data at high speed through unshielded twisted pairs of conductors intended for a much lower data speed and bandwidth. By using a combination of demultiplexing into multiple data channels, encoding the binary signals into a modified three-level duobinary code, and filtering the signals before transmission, data rates as high as 125 megabits per second can be transmitted over four unshielded twisted pairs of conductors. Two illustrative forms of the invention are disclosed, one of which uses two channels for transmission over two twisted pairs in each direction of transmission. The other form of the invention uses four data channels, to further reduce the transmitted bandwidth in each channel, and four twisted pairs of conductors, for transmission in both directions by means of hybrid circuits interconnecting the transmitter and receiver functions at each end of the channels.

29 Claims, 6 Drawing Sheets

METHOD AND APPARATUS FOR TRANSMISSION OF LOCAL AREA NETWORK SIGNALS OVER UNSHIELDED TWISTED PAIRS

BACKGROUND OF THE INVENTION

This invention relates generally to digital communication channels for local area networks and, more particularly, to techniques for using unshielded twisted pairs of conductors as a communication medium in a high-speed local area network. High-performance local area networks (LANs) typically use optical fiber or coaxial cable as the communication medium. For example one token ring network using optical fiber is known as the fiber distributed data interface (FDDI), and is intended for operation at a bandwidth of 125 megabits per second (Mb/s) over distances of about two kilometers. The physical layer medium dependent (PMD) sublayer protocol for FDDI is defined in an American National Standards Institute (ANSI) document designated X3T9.5/84-88. The other sublayer of the physical layer is known as the physical layer protocol (PHY) and is defined in ANSI X3.148-1988.

A significant drawback to LANs using optical fiber as the communication medium is the relatively high cost of the optical fiber. Relatively slow LANs have been proposed using much cheaper unshielded twisted pair wiring, but prior to the present invention it has not been possible to use twisted pairs for typical FDDI bandwidths corresponding to transmission speeds in excess of 100 Mb/second.

SUMMARY OF THE INVENTION

The present invention resides in a digital communication channel, and a corresponding method for its operation, using unshielded twisted pairs of conductors, through which a stream of binary data may be transmitted at rates of up to approximately 125 Mb/s or more. Briefly, and in general terms, the method of the invention comprises the steps of demultiplexing the binary data into at least two parallel channels, where each channel carries signals at a lower bandwidth than the original stream of binary data; encoding the binary data in each of the parallel channels into an n-level code, where n is at least three and the bandwidth of the signals in each channel is further reduced by a factor of approximately two or more; and lowpass filtering the n-level code in each channel to further reduce the bandwidth. The compressed-bandwidth signals in each channel are then transmitted over an unshielded twisted pair of conductors.

At the receiving end of the transmission, the method includes the steps of compensating for the frequency response of each twisted pair of conductors; decoding the n-level signals received over each twisted pair of conductors into corresponding binary signals on multiple channels; and multiplexing the multiple channels into a single high-speed stream of binary data.

More specifically, the encoding step includes forming a three-level modified duobinary code, by subtractively combining the binary data stream with a time-delayed replica of the binary data stream. Preferably, the encoding step includes precoding the binary data, prior to the step of subtractively combining, to form a precoded binary data stream that (a) eliminates error propagation and (b) simplifies decoding.

At the receiving end of the transmission, the decoding step includes transforming the received three-level modified duobinary code back into the binary code. If precoding has been used in the encoding steps, the decoding step is simply a rectifying step, wherein all non-zero levels are translated into a logical "1."

In terms of apparatus, the invention comprises demultiplexing means, for separating the binary data into at least two parallel channels, where each channel carries signals at a lower bandwidth than the original stream of binary data but retaining a conventional FDDI coding format; modulation means, for encoding the binary data in each of the parallel channels into an n-level code, where n is at least three and the bandwidth of the signals in each channel is further reduced by a factor of approximately two or more; lowpass filter means, for further reducing the bandwidth of the n-level code in each channel; and means for transmitting the signals in each channel over an unshielded twisted pair of conductors.

At the receiving end of the transmission, the apparatus further includes equalizer means, for compensating for the frequency response of each twisted pair of conductors; demodulator means, for decoding n-level signals received over each twisted pair of conductors into corresponding binary signals on multiple channels; and multiplexer means, for multiplexing the multiple channels into a single high-speed stream of binary data. As an alternative to the equalizer means and demodulator means, the apparatus may include a decoder based on the Viterbi algorithm.

In the presently preferred embodiment of the invention, the modulation means includes means for forming a three-level modified duobinary code, by subtractively combining the binary data stream with a time-delayed replica of the binary data stream. Preferably, the modulation means also includes means for precoding the binary data, prior to the subtractively combining it with delayed data, to form a precoded binary data stream that eliminates error propagation and simplifies decoding. The demodulation means includes means for transforming the received three-level modified duobinary code back into the binary code.

In an alternate embodiment of the invention, the apparatus includes means for demultiplexing the binary data into four parallel channels, where each channel carries signals at one-fourth the bandwidth of the original stream of binary data. The apparatus is otherwise similar to the embodiment described above, except that this version of the apparatus further includes a hybrid circuit for each twisted pair of conductors, to effect sharing of the pair between transmitting and receiving functions.

In one form of the invention, clock signals are recovered from the received data stream. In another form of the invention, clock signals are transmitted over the same conductors as the data, but at a different frequency; then recovered for use at the receiving end in decoding of the data signals.

It will be appreciated from the foregoing that the present invention represents a significant advance in the field of digital data communication channels, particularly for use in local area networks. Specifically, the invention provides for the transmission of binary data at extremely high speeds, over unshielded twisted pairs of conductors usually applied to the transmission of much lower data rates. Use of demultiplexing, multi-level encoding and filtering of the digital signals results in a sufficient reduction in bandwidth to allow successful transmission over unshielded twisted pairs of conductors. Other aspects and advantages of the invention will become apparent from the following more detailed description, taken in conjunction with the accompanying drawings.

DESCRIPTION OF THE PREFERRED EMBODIMENTS

As shown in the drawings for purposes of illustration, the present invention is concerned with a technique for employing unshielded twisted pairs of conductors in local area networks that typically use optical fibers for the communication medium, such as the fiber distributed data interface (FDDI) token ring network. Unshielded twisted pairs have been proposed for use in token ring networks, but have been capable of only relatively low data transmission rates, such as 4 megabits per second (Mb/s). The present invention provides transmission rates of up to 125 Mb/s over unshielded twisted pairs up to 100 meters long.

In accordance with the invention, this high level of performance is obtained by a combination of features. First, the data stream is demultiplexed into two data streams and transmitted over two or more pairs of conductors. Then, the binary data signals are converted to an n-level coding scheme, where n is three or more, for transmission over the twisted pairs. Finally, the n-level signals are filtered to further compress their bandwidth, but without loss of integrity of the data. These three features of the invention will be discussed in more detail with reference to block diagrams of a transmitter and a receiver structured in accordance with the invention.

A basic difficulty encountered in using unshielded twisted pairs for the transmission of FDDI signals is that, for a transmission rate of 125 Mb/s, a channel bandwidth of about 90 MHz is required, but the typical bandwidth of a twisted pair is very much below this level. The low bandwidth results in high intersymbol interference, which is a measure of the ability to distinguish and successfully decode successive encoded symbols transmitted over the channel. Intersymbol interference effectively limits the length of the channel to only a very short distance, which is not practical for most applications.

The present invention uses a combination of approaches to compress the bandwidth or signal spectrum of FDDI signals such that they can be transmitted over twisted-pair channels of up to 100 meters in length.

Figures 1, 1A, 2:
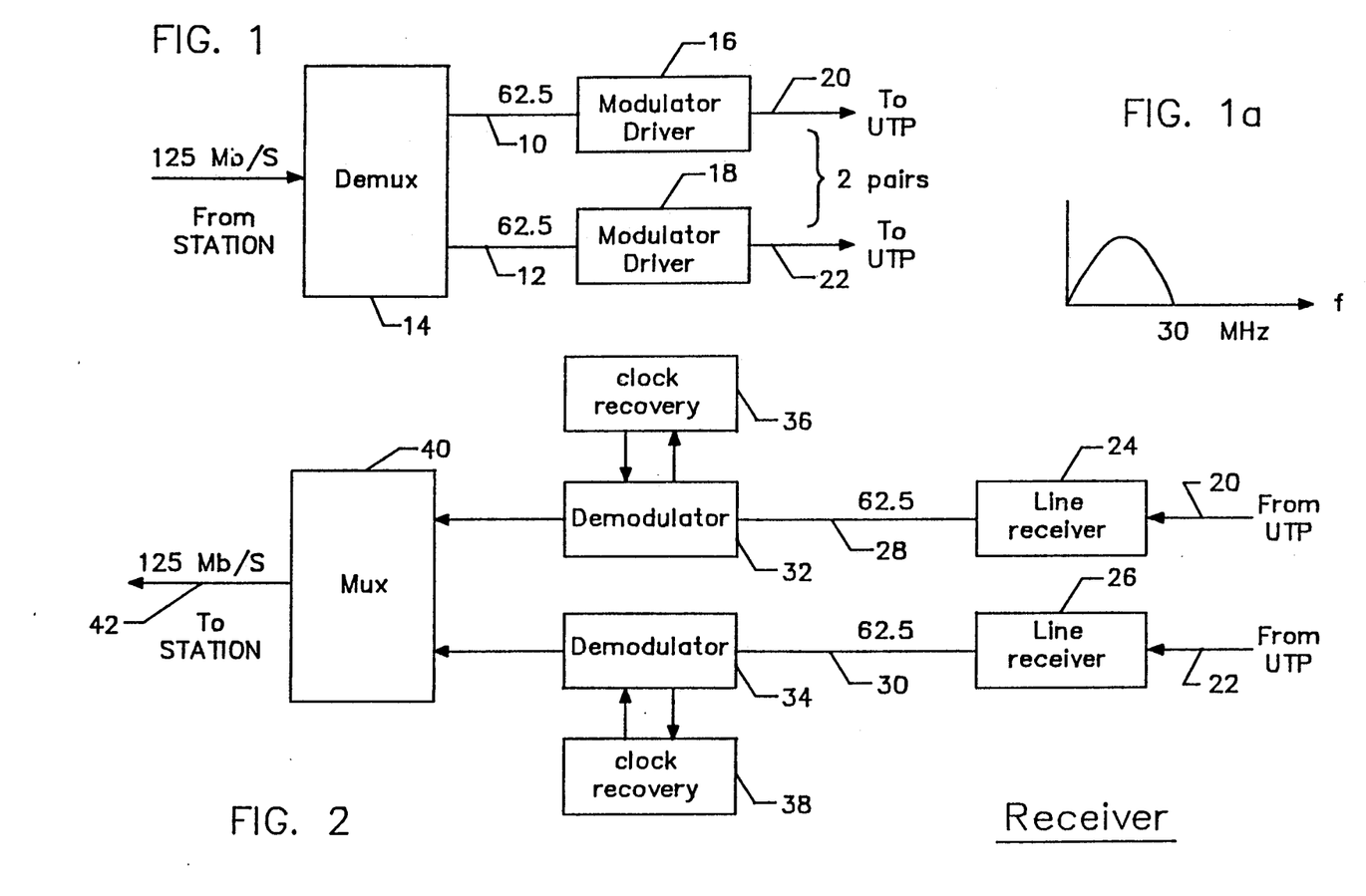
FIG. 1 is block diagram of a transmitter in accordance with the present invention.
FIG. 1a is a graph showing the spectrum of signals transmitted over one channel from the transmitter of FIG. 1.
FIG. 2 is a block diagram of a receiver for use in conjunction with the transmitter of FIG. 1.

At a transmitter in accordance with the present invention, the FDDI signals are first demultiplexed with respect to time, i.e. the data signals, which are generated at a rate of 125 Mb/s, are split into two data streams at a 62.5 Mb/s data rate, as indicated at 10 and 12 in FIG. 1, by a demultiplexer 14. Each data stream 10 and 12 is processed by a modulator driver 16, 18, respectively, before being coupled to its separate unshielded twisted pair 20, 22, respectively. As will be seen, the modulator drivers 16, 18 further compress the bandwidth of each channel by a factor of slightly more than two, to approximately 30 MHz, as indicated in the spectral graph of FIG. 1a.

In the receiver, shown in FIG. 2, signals on the unshielded twisted pairs 20, 22 are received in line receivers 24, 26, and coupled over lines 28, 30 to demodulators 32, 34, respectively. Clock recovery circuits 36, 38 recover clocking information from signals derived from the demodulators 32, 34, and supply clock signals back to the demodulators 32, 34. After demodulation, the data signals derived by the demodulators 32, 34 are combined in a multiplexer 40, which provides a single output on line 42, carrying data at the 125 Mb/s rate.

Figure 3:
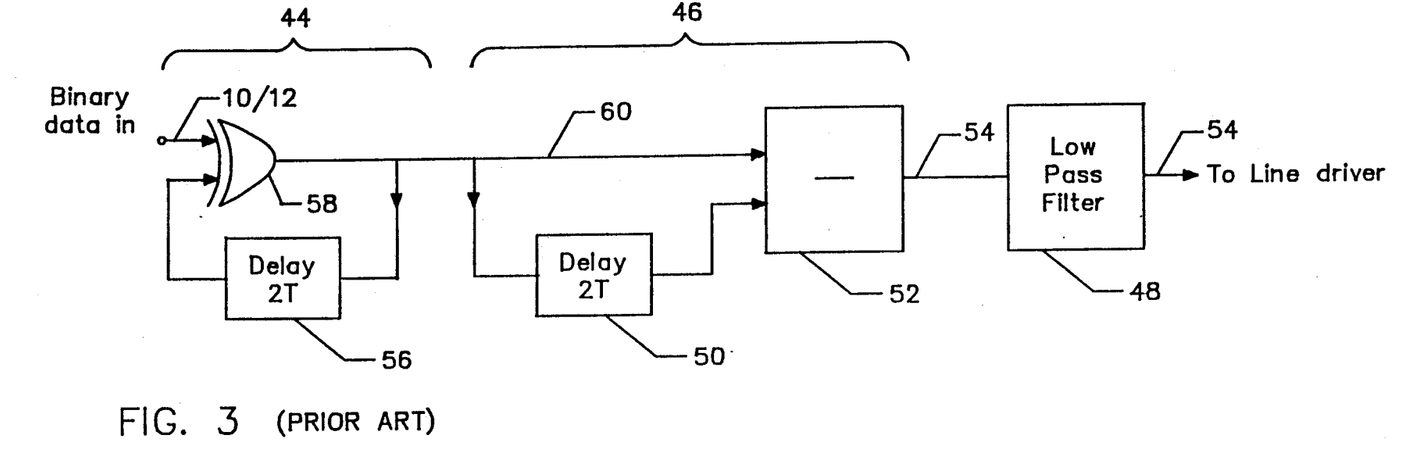
FIG. 3 is a block diagram of a modulator used in the transmitter of FIG. 1.

The modulator 16, 18 is shown in more detail in FIG. 3, and includes a precoder section 44, a modified duobinary encoder section 46, and a low-pass filter 48. As is known in the digital communication art, duobinary encoding is a technique for increasing the bit rate that can be handled over a channel of given bandwidth. Duobinary encoding is effected by combining two successive binary signals to form a multilevel signal, which is further processed by a shaping filter. The resulting signal still has the disadvantage that it contains frequency components in the vicinity of zero frequency. This property is avoided in "modified" duobinary encoding, in which binary signals two time periods apart are combined subtractively. The result is a three-level signal with no significant components in the vicinity of zero frequency. A low-pass filter with a sine function response is employed after the encoding step.

The modified duobinary encoder 46 includes a delay circuit 50, which interposes a delay equivalent to two data periods, and a subtractor circuit 52, in which the delayed binary data signals are subtracted from the undelayed incoming binary data signals, to produce a three-level modified duobinary code on line 54. Modified duobinary code has the property that decoding it requires knowledge of prior values of the decoded signals. However, if the binary data signal is first processed by a precoder, before input to the modified duobinary encoder 46, the decoding logic is simplified and each duobinary input signal can be translated directly into binary code without reference to prior values of the translated binary code.

One form of precoding is indicated by the precoder section 44, which includes another two-cycle delay circuit 56, and an exclusive OR gate 58. One input of the exclusive OR gate 58 is the uncoded binary data on line 10 or 12. The delay circuit 56 takes its input signals from the output of the exclusive OR gate 58, and provides the second input to the exclusive OR gate. The output of the exclusive OR gate 58, on line 60, provides precoded binary signals to the subtractor circuit 52 and to delay circuit 50. It will be understood that FIG. 3 is for purposes of explanation and that various other implementations are possible. For example, it will be apparent that one of the delay circuits 50 and 56 is redundant, since they both derive input from line 60.

Translation from binary code to modified duobinary code effects a bandwidth reduction by a factor of approximately two. Other multilevel encoding schemes were investigated as possibilities because, in general, a binary signal spectrum can be compressed by a factor of n by using $2^n$ amplitude coding levels. However, as the number of levels is increased, immunity to crosstalk, as measured by the distance between adjacent levels, decreases. Moreover, the benefits obtained from spectrum compression may be outweighed by the decrease in immunity to crosstalk. For example, a change from 8-level modulation to 16-level modulation provides a bandwidth reduction of 25% and a corresponding reduction in crosstalk of about 2 dB (decibels), but the crosstalk immunity (the distance between adjacent levels) drops by 6 dB. Thus the 16-level system gives a worse performance than the 8-level system. The three-level modified duobinary approach was selected as providing optimum bandwidth compression, by a factor of two, without substantially decreasing crosstalk immunity. The three-level encoding approach uses the least number of coding levels needed to achieve a halving of the bandwidth, and has the additional advantage that it has no components in the vicinity of zero frequency.

The last stage of processing after modified duobinary modulation is filtering in the lowpass filter 48. This further reduces the bandwidth of the encoded signals, to a spectrum similar to the one shown in FIG. 1a. In the illustrative embodiment, each channel bandwidth is reduced to about 30 MHz for transmission through a twisted pair. This level is deliberately chosen to keep the bandwidth around or below 30 MHz. Above this threshold there are more stringent requirements imposed by the Federal Communications Commission (FCC).

Figure 4:
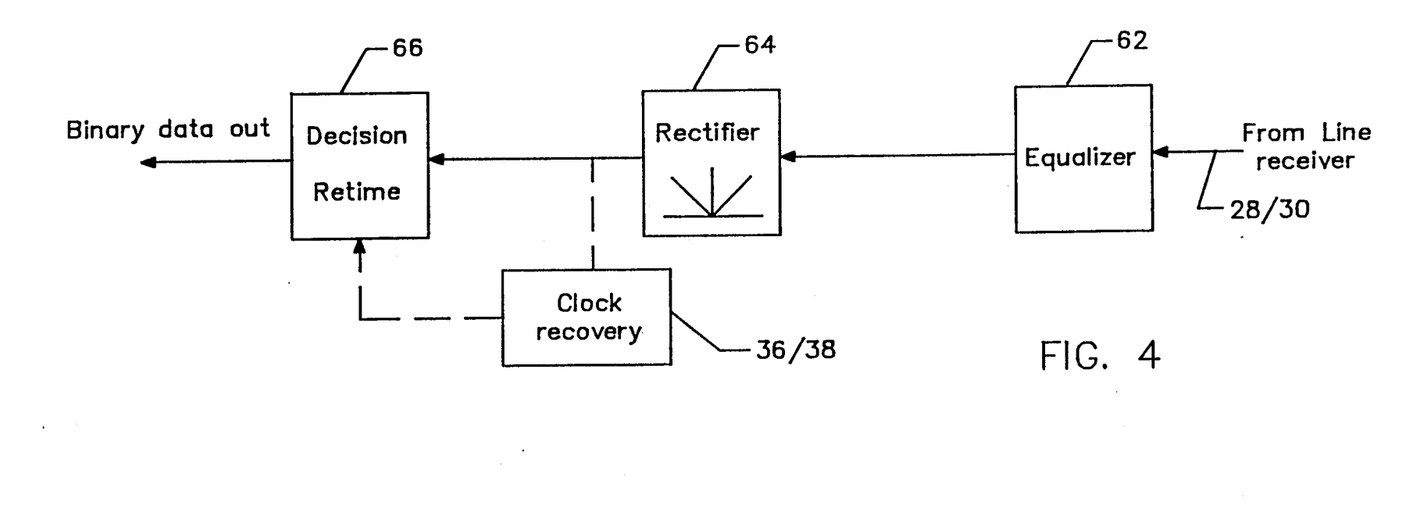
FIG. 4 is a block diagram of a demodulator used in the receiver of FIG. 2.

The demodulator 32 or 34 comprises, as shown in FIG. 4, an equalizer 62 and a rectifier 64. As will become apparent from an example to be described, the demodulation process is simply one of rectification if the modulator includes a precoding section. The rectifier 64 is basically a full-wave rectifier, and provides a logical "1" output signal when its input is either +1 or −1. If the input to the rectifier 64 is a zero, the rectifier output is a logical "0." The clock recovery circuit 36, 38 provides control signals to a decision circuit 66, which further modifies the output of the rectifier 64 and provides demodulator output to the multiplexer 40.

Figure 5A:
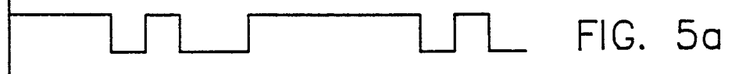
FIGS. 5a-5f are timing diagrams showing a data stream at various stages of modulation and demodulation in the transmitter and receiver of FIGS. 1 and 2.
Figure 5B:
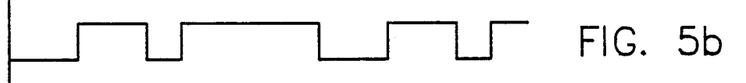
Figure 5C:
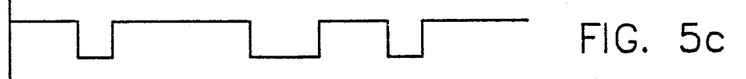
Figure 5D:
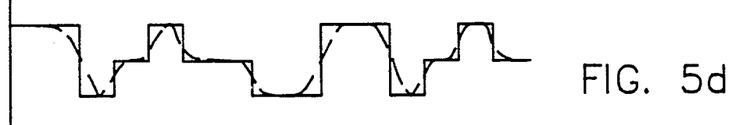

FIGS. 5a–5f together provide an example of the modified duobinary encoding and decoding process used in the invention. FIG. 5a is an illustrative waveform of a binary signal at the input of the modulator, on line 10 or 12. FIG. 5b is the waveform of a corresponding signal output from the delay circuit 56 and applied to the other input of the exclusive OR circuit 58. FIG. 5c is the resultant output of the exclusive OR gate 58, i.e. it represents the exclusive OR of the signals shown in FIGS. 5a and 5b. It will be noted that the waveform of FIG. 5b is delayed by two time cycles with respect to the output signal of FIG. 5c, which represents the precoded binary input signal.

The subtractor circuit 52 subtracts the delayed input signal, which is the same as the one shown in FIG. 5b, from the undelayed input signal of FIG. 5c. The result is the three-level signal of FIG. 5d, which is then filtered in the low-pass filter 48, and transmitted onto one of the twisted pairs 20, 22 in a form similar to the waveform shown by a broken line in FIG. 5d.

Figure 5E:
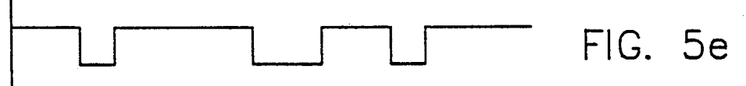

Decoding in the demodulator 32, 34 takes one of two possible forms, depending on whether or not precoding is performed during modulation. If there is no modulator precoding, a level of +1 in the transmitted signal is translated into a logical "1" in the decoded signal, and a level of −1 in the transmitted signal is translated into a logical "0" in the decoded signal. A zero level in the transmitted signal is translated into the logical level of the decoded signal that occurred two time cycles earlier. The result of this type of decoding is shown FIG. 5e. The following table shows the decoding translation from transmitted data (TD) to decoded data (DD):

TD: +1 +1 −1 0 +1 0 0 −1 −1 +1 +1 −1 0 +1 0
DD: 1 1 0 1 1 1 1 0 0 1 1 0 1 1 1

It will be observed that this translation, the result of which is shown in FIG. 5e, yields the same waveform that was input to the encoding section (FIG. 5c).

The other type of decoding is much simpler and is used when a precoding section is included in the modulator. In this case, each incoming bit of the transmitted three-level data can be translated to binary code without reference to time-displaced data. Specifically, levels of +1 and −1 in the transmitted data are translated into a logical "1" and a zero level is translated into a logical "0," as shown below:

TD: +1 +1 −1 0 +1 0 0 −1 −1 +1 +1 −1 0 +1 0
DD: 1 1 1 0 1 0 0 1 1 1 1 1 0 1 0

Figure 5F:
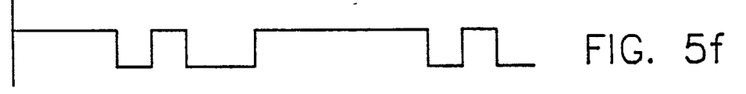

The resulting decoded data is shown in FIG. 5f, which is the same as the waveform (FIG. 5a) that was input to the precoding section of the modulator.

An important advantage of the invention is that it retains the conventional signal format for transmission on a fiber distributed data interface (FDDI) token ring network. In the FDDI system, signals are presented to the physical protocol layer coded in accordance with NRZI coding. NRZI stands for "nonreturn to zero invert on ones." What this means is that a polarity transition in the signal represents a logical "1" and the absence of a polarity transition represents a logical "0." Further, the FDDI formats signals into five-bit code groups. Each transmitted symbol, which may be a four-bit data symbol, or a control symbol, is represented as a five-bit sequence of NRZI bits. This is sometimes referred to as 4B/5B NRZI coding. The coding format is discussed in American National Standard ANSI X3.148-1988 defining the physical layer protocol (PHY) for FDDI. One significant advantage of 4B/5B NRZI coding is that it guarantees a minimum signal transition rate, and therefore minimizes direct-current components and ensures that a clock signal can be recovered. To guarantee these properties, 4B/5B NRZI encoding precludes the use of some five-bit code groups, having too few transitions or too many consecutive zeros. The present invention retains the 4B/5B NRZI format, and therefore retains the advantages of this type of coding in the FDDI.

Figure 6:
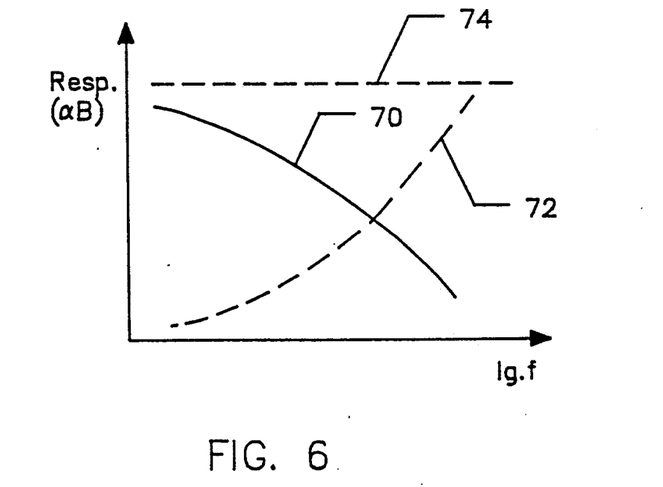
FIG. 6 is a graph showing the frequency response of a twisted pair communication channel before and after equalization.

The frequency response of an unshielded twisted pair of conductors is shown diagrammatically at 70 in FIG. 6. As the frequency of transmission increases, the response or output from the twisted pair decreases. The principal function of the equalizer 62 (FIG. 4) is to compensate for this fall-off in response at higher frequencies. Accordingly, the equalizer 62 is designed to have a frequency response inverse to that of the twisted pair, as shown at 72 in FIG. 6. The goal is to provide a composite frequency response that is substantially uniform with frequency over a spectrum of interest, as shown at 74. Since the frequency response of the twisted pair will depend on its length, the equalizer will not provide perfect compensation for all lengths of cable. As a compromise, the equalizer should be designed to provide compensation for a most commonly used cable runlength, or for one half of the maximum runlength. In general, equalization results in an increase in crosstalk level. If the crosstalk becomes a limiting factor, it is preferable to use a decoder (not shown) based on the Viterbi algorithm, to replace the equalizer 62 and the rectifier 64. A description of the Viterbi algorithm may be found in "Data Communications, Networks, and Systems," Thomas C. Bartee, Editor-in-Chief, published by Howard W. Sams & Co., Indianapolis, Ind. (1985).

Figures 7, 7A, 8:
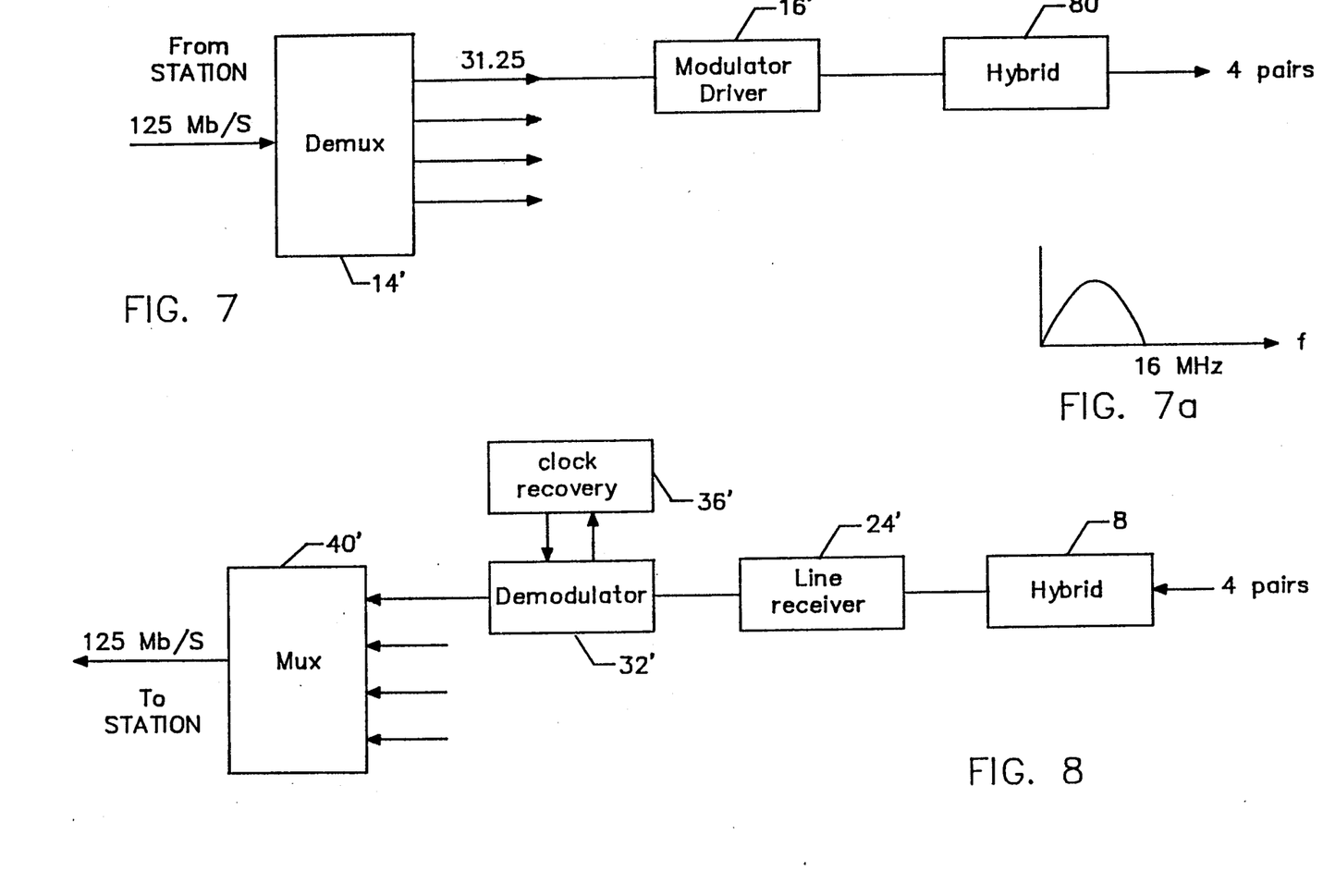
FIG. 7 is a block diagram of an alternate embodiment of a transmitter.
FIG. 7a is a graph showing the spectrum of signals transmitted over one channel from the transmitter of FIG. 7.
FIG. 8 is a block diagram of a receiver for use in conjunction with the transmitter of FIG. 6.

FIGS. 7 and 8 show an alternate embodiment of the invention in which four twisted pairs are used for both directions of transmission. The transmitter contains a 1:4 demultiplexer 14' to provide four data streams of 31.25 Mb/s, and the receiver contains a 4:1 multiplexer 40'. Modulator driver circuits 16', line receivers 24', demodulators 32' and clock recovery circuits 36' are of similar design to their counterparts in FIGS. 1 and 2. The transmitter and receiver also include a hybrid circuit 80, which is shown in more detail in FIG. 9.

Figure 9:
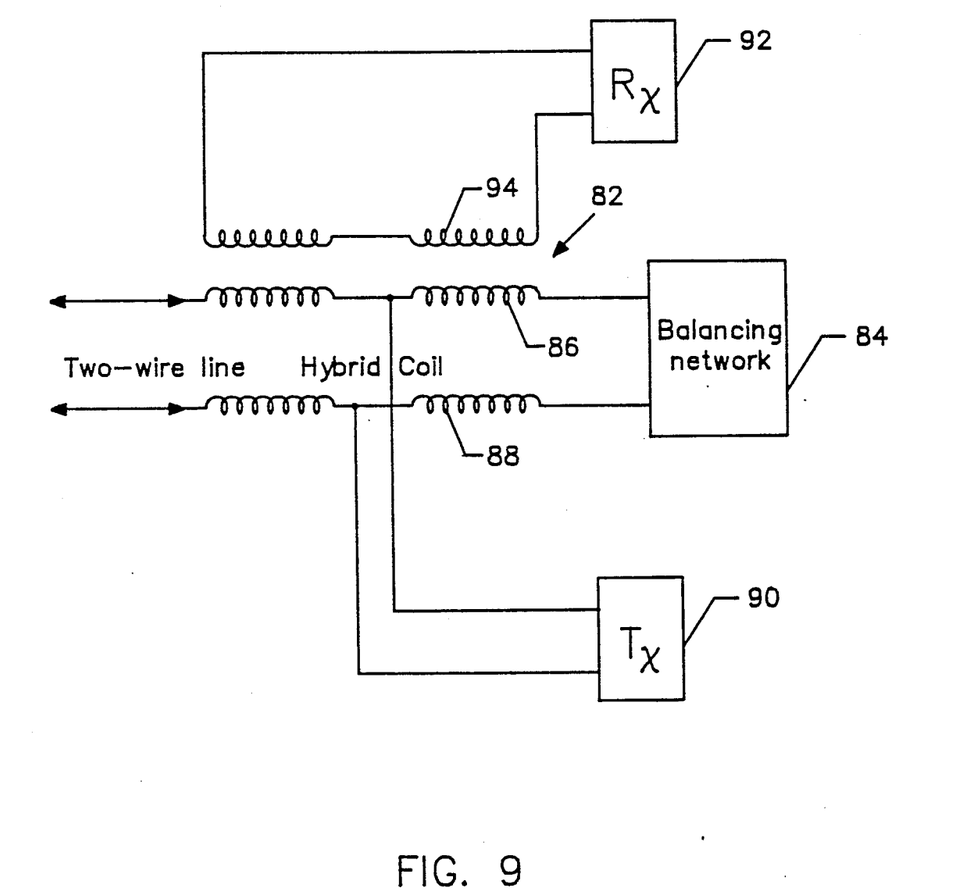
FIG. 9 is a block diagram of a hybrid circuit of the type used in the transmitters and receivers of FIGS. 7, 8, 10 and 11.

The hybrid is a conventional communications circuit used to share transmitting and receiving functions on one pair of conductors. The hybrid includes a three-winding transformer 82 and an associated balancing network 84. One of the transformer windings 86 is connected in series with one conductor of a twisted pair, and another winding 88 is connected in series with the other conductor of the pair, which is terminated in the balancing network 84. The transmitter, shown at 90, is connected to the center taps of these two windings 86, 88. The receiver, indicated at 92, is connected to the third of the transformer windings 94. If the impedance of the twisted pair and the balancing circuit are properly matched, all currents produced by the transmitted signal in the upper half of the hybrid transformer will be equal and in opposite directions, i.e. they will have no effect on the receiver 90. Also, in a properly balanced hybrid the received signals are self-cancelling in the transmitter circuit.

As shown diagrammatically in FIG. 7a, the channel bandwidth for each of the four channels of FIG. 7 is approximately 16 MHz. This results in better performance, as measured by lower crosstalk and intersymbol interference. Also, the time duration of one bit of data in each channel is doubled, from 61 ns to 32 ns. The obvious drawback of the embodiment of the invention shown in FIGS. 7 and 8 is that it requires more than twice as much hardware at each end of the transmission path, twice as many modulators and demodulators, and four additional hybrid circuits.

In the description thus far, it has been assumed that clock signals for the demodulator will be recovered from the data signal itself. This can be done in a variety of ways. It will be apparent that the transmitted data signal normally has a strong signal component at the clock frequency. This can be recovered by appropriate filtering, and the demodulators can then be synchronized with this recovered clock signal. An alternate approach is to transmit the clock signal separately, but on the same channel as the data, as shown in the embodiments of FIGS. 10 and 11.

Figures 10, 10A, 11:
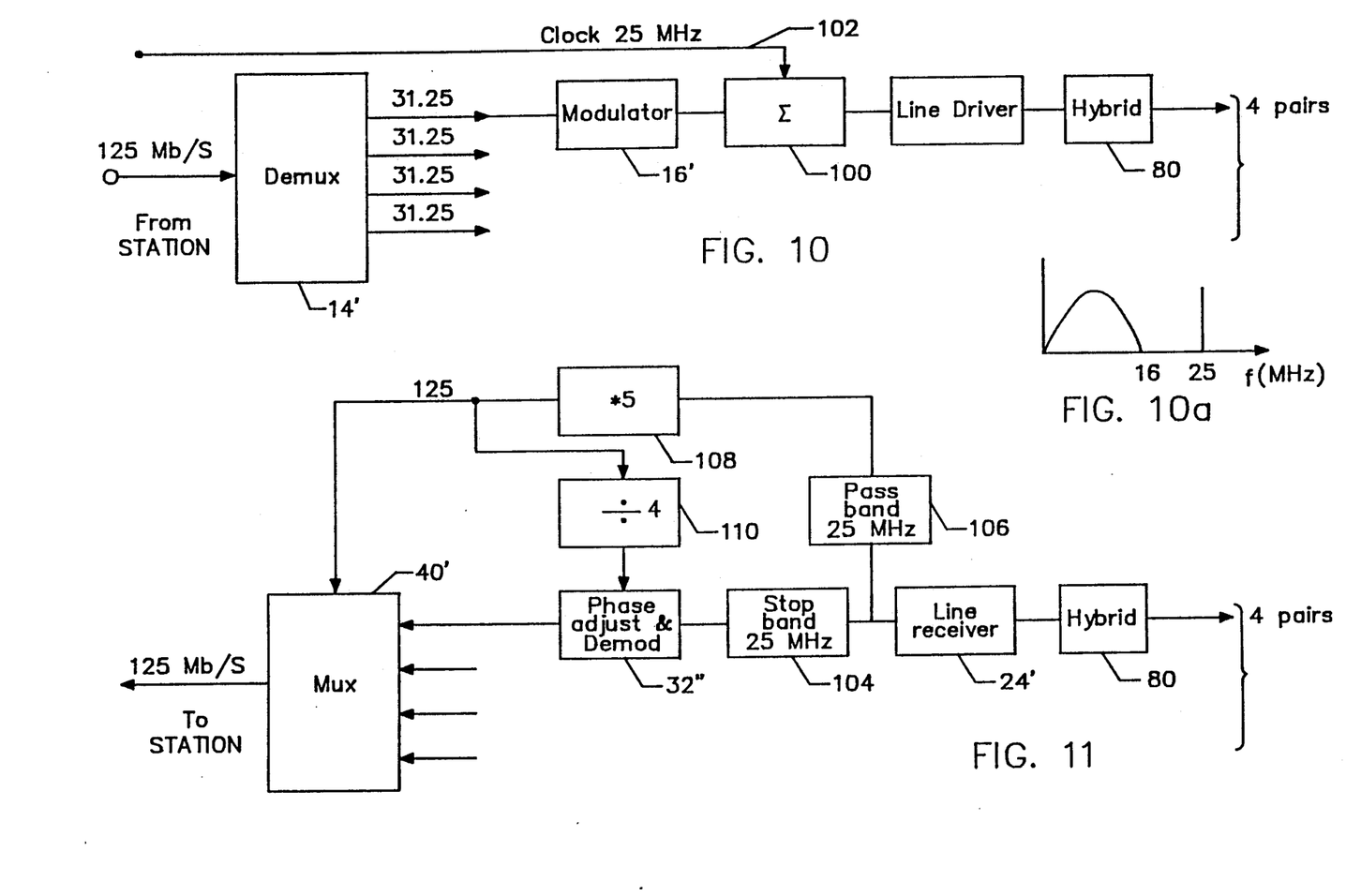
FIG. 10 is a block diagram of yet another embodiment of a transmitter, similar to the one shown in FIG. 7 but in which a separated clock signal is transmitted with the data.
FIG. 11 is a block diagram of a receiver for use in conjunction with the transmitter of FIG. 10.

The transmitter of FIG. 10 is similar to that of FIG. 7 except that it includes a signal summation circuit 100 between each modulator 16' and hybrid 80. In the summation circuit 100, the data signals from the modulator 16' are combined with a 25-MHz clock signal supplied on line 102. The resulting channel spectrum is shown in FIG. 10a, and includes the same 16-MHz bandwidth for the data signal, and a frequency line at 25 MHz for the clock signal.

The receiver of FIG. 11 is similar to that of FIG. 8, except that it includes a stop-band filter 104 to prevent the clock signal from reaching the modified demodulator 32'', and a 25-MHz passband filter 106 connected to extract the clock signal from the received signals. The 25-MHz clock signal is multiplied by five (in block 108) to provide a 125-MHz clock signal to the multiplexer 40', then divided by four (in block 110), to provide a 31.25-MHz clock signal for use in the demodulators 32''. The demodulators 32'' include a phase adjustment circuit that aligns the clock signal in the middle of a received data bit interval.

Other variations of the invention are possible, including the use of phantom circuits to provide additional channels. A phantom circuit is a well known communication device, in which two pairs of conductors provide a total of three communication channels. For example, if two pairs of twisted pairs are used in each direction, the use of phantom circuits provide a bandwidth reduction by a factor of three. The demultiplexer 14 in the transmitter must then be a 1:3 demultiplexer. Phantom circuits may also be used to detect cable breaks. For example, a 20-KHz signal can be injected into the communication channels through a phantom circuit at each transmitter, and detected at each receiver. Absence of the 20-KHz signal at any receiver is indicative of a cable break in the twisted-pair cable.

It will be appreciated from the foregoing that the present invention represents a significant advance in the field of local area networks, in that high-speed networks designed to transmit through optical fibers, as in FDDI, may use twisted-pair cables instead, without degradation in performance for transmission distances up to about 100 meters. In particular, the invention provides for transmission of up to 125 Mb/s through four unshielded twisted pairs of conductors. It will also be appreciated that, although several embodiments of the invention have been described in detail for purposes of illustration, various modifications may be made without departing from the spirit and scope of the invention. Accordingly, the invention is not to be limited except as by the appended claims.

We claim:

1. A method for transmitting a stream of high-speed binary data over twisted pairs of conductors operating as baseband communications channels, the method comprising the steps of:

demultiplexing the binary data into at least two parallel channels, wherein each channel carries demultiplexed binary data signals at a lower bandwidth than the original stream of binary data;

encoding the binary data in each of the parallel channels into an n-level amplitude-modulated code, wherein n is at least three and the bandwidth of the signals in each channel is further reduced by a factor of approximately two or more;

lowpass filtering the n-level code in each channel to further reduce the bandwidth; and transmitting the signals in each channel over an unshielded twisted pair of conductors operating as a baseband communication channel.

2. A method as defined in claim 1, and further comprising the steps of:

compensating for the frequency response of each twisted pair of conductors;

decoding n-level signals received over each twisted pair of conductors into corresponding binary signals on multiple channels; and multiplexing the multiple channels into a single high-speed stream of binary data.

3. A method as defined in claim 1, wherein:

the encoding step includes forming a three-level modified duobinary code.

4. A method as defined in claim 3, wherein the step of forming a three-level modified duobinary code includes:

subtractively combining the binary data stream with a time-delayed replica of the binary data stream, to yield the modified duobinary code.

5. A method as defined in claim 4, wherein the step of forming a three-level modified duobinary code further includes:

precoding the binary data, prior to the step of subtractively combining, to form a precoded binary data stream that eliminates error propagation and simplifies decoding.

6. A method as defined in claim 2, wherein:

the encoding step includes forming a three-level modified duobinary code; and the decoding step includes transforming a received three-level modified duobinary code into a binary code.

7. A method as defined in claim 6, wherein the step of forming a three-level modified duobinary code includes:

subtractively combining the binary data stream with a time-delayed replica of the binary data stream, to yield the modified duobinary code.

8. A method as defined in claim 7, wherein the step of transforming the three-level modified duobinary code into a binary code includes:

rectifying the three-level code.

9. A method as defined in claim 8, wherein the step of forming a three-level modified duobinary code further includes:

precoding the binary data, prior to the step of subtractively combining, to form a precoded binary data stream that eliminates error propagation and simplifies decoding.

10. A method for transmitting a stream of high-speed binary data over twisted pairs of conductors operating as baseband communication channels, the method comprising the steps of:

demultiplexing the binary data into two parallel channels, wherein each channel carries demultiplexed binary data signals at half of the bandwidth of the original stream of binary data;

encoding the binary data in each of the parallel channels into a 3-level amplitude-modulated modified duobinary code, wherein the bandwidth of the signals in each channel is further reduced by a factor of approximately two;

lowpass filtering the n-level code in each channel to further reduce the bandwidth;

transmitting the signals in each channel over an unshielded twisted pair of conductors operating as a baseband communication channel;

receiving the transmitted signals;

compensating for the frequency response of each twisted pair of conductors;

decoding the 3-level signals received over each twisted pair of conductors into corresponding binary signals on two channels; and multiplexing the two channels into a single high-speed stream of binary data.

11. A method as defined in claim 10, wherein the step of forming a three-level modified duobinary code includes:

subtractively combining the binary data stream with a time-delayed replica of the binary data stream to yield the modified duobinary code.

12. A method as defined in claim 11, wherein the step of forming a three-level modified duobinary code further includes:

precoding the binary data, prior to the step of subtractively combining, to form a precoded binary data stream that eliminates error propagation and simplifies decoding.

13. A method as defined in claim 10, wherein:

the original data stream is processed at a rate of approximately 125 megabits per second;

the demultiplexing step provides two channels at approximately 62.5 megabits per second;

the encoding step reduces the effective speed of each channel to approximately 31.25 megabits per second; and the filtering step reduces the bandwidth of each channel to approximately 30 megahertz.

14. A method as defined in claim 10, wherein:

the method is used in a fiber distributed data interface (FDDI) communication network, using a signal format in which each four-bit data code is encoded into a five-bit NRZI (nonreturn to zero invert on ones) code in accordance with coding scheme referred to as 4B/5B; and the demultiplexing step retains the 4B/5B format in each of its resultant channels.

15. Digital signal communication apparatus for transmitting a stream of high-speed binary data over twisted pairs of conductors operating baseband communication channels, the apparatus comprising:

demultiplexing means, for separating the binary data into at least two parallel channels, wherein each channel carries demultiplexed binary data signals at a lower bandwidth than the original stream of binary data;

modulation means, for encoding the binary data in each of the parallel channels into an n-level amplitude-modulated code, wherein n is at least three and the bandwidth of the signals in each channel is further reduced by a factor of approximately two or more;

lowpass filter means, for further reducing the bandwidth of the n-level code in each channel; and means for transmitting the signals in each channel over an unshielded twisted pair of conductors operating as a baseband communication channel.

16. Apparatus as defined in claim 15, and further comprising:
equalizer means, for compensating for the frequency response of each twisted pair of conductors;
demodulator means, for decoding n-level signals received over each twisted pair of conductors into corresponding binary signals on multiple channels; and
multiplexer mean, for multiplexing the multiple channels into a single high-speed stream of binary data.

17. Apparatus as defined in claim 15, wherein:
the modulation means includes means for forming a three-level modified duobinary code.

18. Apparatus as defined in claim 17, wherein the means for forming a three-level modified duobinary code includes:
means for subtractively combining the binary data stream with a time-delayed replica of the binary data stream, to yield the modified duobinary code.

19. Apparatus as defined in claim 17, wherein the means for forming a three-level modified duobinary code further includes:
means for precoding the binary data, prior to the subtractively combining it with delayed data, to form a precoded binary data stream that simplifies decoding.

20. Apparatus as defined in claim 16, wherein:
the modulation means includes means for forming a three-level modified duobinary code; and
the demodulation means includes means for transforming a received three-level modified duobinary code into a binary code.

21. Apparatus as defined in claim 20, wherein the means for forming a three-level modified duobinary code includes:
means for subtractively combining the binary data stream with a time-delayed replica of the binary data stream, to yield the modified duobinary code.

22. Apparatus as defined in claim 21, wherein the means for transforming the three-level modified duobinary code into a binary code includes:
means for rectifying the three-level code.

23. Apparatus as defined in claim 22, wherein the means for forming a three-level modified duobinary code further includes:
means for precoding the binary data, prior to the step of subtractively combining, to form a precoded binary data stream that simplifies decoding.

24. A method for transmitting a stream of high-speed binary data over twisted pairs of conductors operating as baseband communication channels, the method comprising the steps of:
demultiplexing the binary data into four parallel channels, wherein each channel carries demultiplexed binary data signals at one-fourth the bandwidth of the original stream of binary data;
encoding the binary data in each of the parallel channels into a 3-level amplitude-modulated modified duobinary code, wherein the bandwidth of the signals in each channel is further reduced by a factor of approximately two;
lowpass filtering the n-level code in each channel to further reduce the bandwidth;

transmitting the signals in each channel over an unshielded twisted pair of conductors operating as a baseband communication channel, wherein each transmission channel shares its twisted pair of conductors for transmitting and receiving operations by means of a hybrid circuit interconnecting the transmitting and receiving operations;
receiving the transmitted signals;
compensating for the frequency response of each twisted pair of conductors;
decoding the 3-level signals received over each twisted pair of conductors into corresponding binary signals on four channels; and
multiplexing the four channels into a single high-speed stream of binary data.

25. A method as defined in claim 24, and further comprising the steps of:
transmitting a clock signal over the same conductors;
recovering the transmitted clock signal for use in decoding the received data signals.

26. A method as defined in claim 24, and further comprising the step of:
recovering a clock signal from received data signals, for use in decoding the received data signals.

27. Digital signal communication apparatus for transmitting a stream of high-speed binary data over twisted pairs of conductors operating as baseband communication channels, the apparatus comprising:
means for demultiplexing the binary data into four parallel channels, wherein each channel carries demultiplexed binary data signals at one-fourth the bandwidth of the original stream of binary data;
modulator means, for encoding the binary data in each of the parallel channels into a 3-level amplitude-modulated duobinary code, wherein the bandwidth of the signals in each channel is further reduced by a factor of approximately two;
means for lowpass filtering the n-level code in each channel to further reduce the bandwidth; and
means for transmitting the signals in each channel over an unshielded twisted pair of conductors operating as a baseband communication channel;
a hybrid circuit for each twisted pair of conductors, to effect sharing of the pair between transmitting and receiving functions;
means for receiving the transmitted signals;
equalizer means, for compensating for the frequency response of each twisted pair of conductors;
demodulator means, for decoding the 3-level signals received over each twisted pair of conductors into corresponding binary signals on four channels; and
multiplexer means, for multiplexing the four channels into a single high-speed stream of binary data.

28. Digital signal communication apparatus as defined in claim 27, wherein:
the apparatus is used in a fiber distributed data interface (FDDI) communication network, using a signal format in which each four-bit data code is encoded into a five-bit NRZI (nonreturn to zero invert on ones) code in accordance with coding scheme referred to as 4B/5B; and
the means for demultiplexing the binary data retains the 4B/5B format in each of its resultant channels.

29. A method for transmitting a stream of high-speed binary data over twisted pairs of conductors operating as baseband communication channels, the method comprising the steps of:

demultiplexing the binary data into two parallel channels, wherein each channel carries demultiplexed binary data signals at half of the bandwidth of the original stream of binary data;

encoding the binary data in each of the parallel channels into a 3-level modified duobinary code, wherein the bandwidth of the signals in each channel is further reduced by a factor of approximately two;

lowpass filtering the n-level code in each channel to further reduce the bandwidth;

transmitting the signals in each channel over an unshielded twisted pair of conductors operating as a baseband communication channel;

receiving the transmitted signals;

decoding, using a decoder based on the Viterbi algorithm, the 3-level signals received over each twisted pair of conductors into corresponding binary signals on two channels; and multiplexing the two channels into a single high-speed stream of binary data.

* * * * *